Nov. 11, 1958 F. E. RUNGE 2,859,973

TURNTABLE CHANGING MECHANISM FOR MAGNETIC RECORDER

Filed July 20, 1953 4 Sheets-Sheet 1

INVENTOR.
FRANK E. RUNGE
BY
H. G. Manning
ATTORNEY

TURNTABLE CHANGING MECHANISM FOR MAGNETIC RECORDER

Filed July 20, 1953 4 Sheets-Sheet 2

INVENTOR.
FRANK E. RUNGE
BY
H. G. Manning
ATTORNEY

INVENTOR.
FRANK E. RUNGE
BY
H. G. Manning
ATTORNEY

Nov. 11, 1958 F. E. RUNGE 2,859,973

TURNTABLE CHANGING MECHANISM FOR MAGNETIC RECORDER

Filed July 20, 1953 4 Sheets-Sheet 4

INVENTOR.
FRANK E. RUNGE
BY
H. G. Manning
ATTORNEY

United States Patent Office 2,859,973

Patented Nov. 11, 1958

2,859,973

TURNTABLE CHANGING MECHANISM FOR MAGNETIC RECORDER

Frank E. Runge, Branford, Conn., assignor to The Soundscriber Corporation, New Haven, Conn., a corporation of Connecticut Application July 20, 1953, Serial No. 368,851

7 Claims. (Cl. 274—4)

This invention relates to sound recording and reproducing devices and more particularly to a long playing magnetic recording and playback apparatus wherein the sound is recorded transversely on a wide flexible strip of tape covered on one side with an emulsion of magnetic particles.

One object of this invention is to provide a practical recording and reproducing apparatus of the above nature, wherein a series of successive substantially parallel arcuate sound tracks are impressed laterally across a slowly moving recording magnetic tape by means of a plurality of electromagnetic transducer heads radially disposed on a rotating turntable member located under said tape.

A further object is to provide an apparatus of the above nature in which the turntable may be laterally removed from the driving mechanism for replacement whenever necessary by first causing its spindle to drop down below the turntable.

A further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawings one form in which the invention may conveniently be embodied in practice.

The present invention relates to an improvement over the inventions disclosed in the co-pending application of Lincoln Thompson, Frank E. Runge and William H. Lyon, Serial Number 255,184, filed November 7, 1951, now Patent No. 2,750,449, issued June 12, 1956, entitled "Long Playing Magnetic Tape Recorder"; an application of William H. Lyon, Serial Number 284,716, filed April 28, 1952, now Patent No. 2,772,328, issued November 27, 1956, entitled "Automatic Synchronization Apparatus for Long Time Transverse Magnetic Sound Recorder and Reproducer"; an application of Lincoln Thompson, Frank E. Runge, and William H. Lyon, Serial Number 327,834, filed December 24, 1952, now Patent No. 2,743,319, issued April 24, 1956, entitled "Scanning Mechanism for Magnetic Tape Recorders," and an application of William H. Lyon, Serial Number 350,481, filed April 22, 1953, now Patent No. 2,803,709, issued August 20, 1957 entitled "Knee Action Pressure Plate for Magnetic Tape Recorder."

Figure 1:
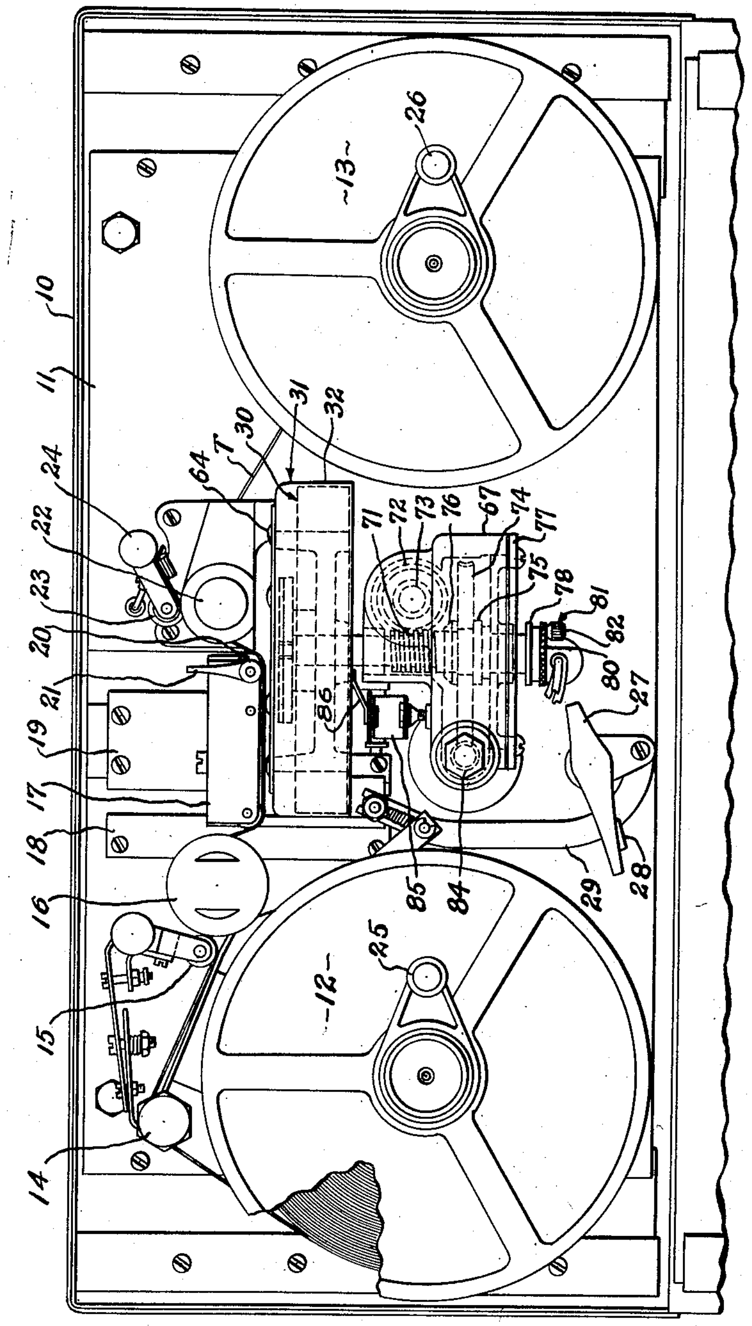
Fig. 1 represents a front view in elevation of a magnetic recorder and reproducer having the removable turntable mechanism embodied therein.
Figure 2:
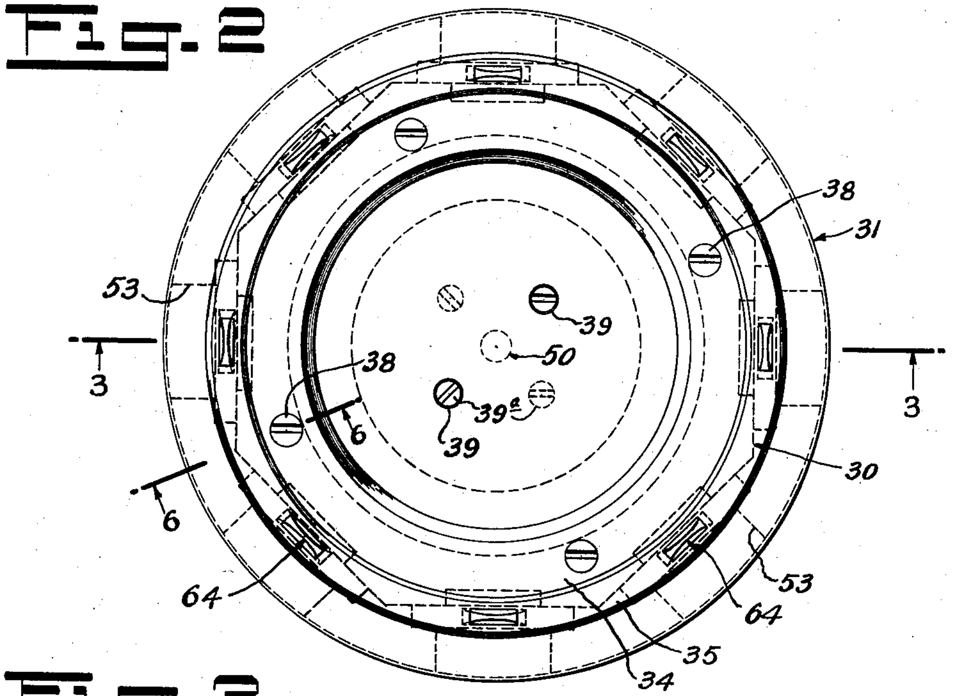
Fig. 2 is a top plan view of the removable turntable, shown by itself, and illustrating the location of the transducer heads mounted thereon.

Referring now to the drawings in which like reference numerals denote corresponding parts throughout the several views, the numeral 10 indicates generally the cabinet of the improved apparatus, and the numeral 11 the chassis on which the working parts are mounted.

The chassis is provided with a feed reel 12 and a take-up reel 13, which are operated by means of handles 25, 26 for adjustment and feeding purposes.

Mounted on the chassis 11 is a horizontal guide spindle 14 over which the tape T passes after leaving the feed reel 12.

From the guide spindle 14, the tape T passes under a tapered roller 15, and over a guide drum 16, from which it passes beneath a pressure gate 17, which forces it into contact with the transducer heads 64, of which there are eight in number, for a purpose to be hereinafter more fully described. The pressure gate 17 is mounted for adjustable vertical sliding movement in a pair of ways 18, 19 attached to the chassis 11.

The tape T is adapted to pass under an eccentric roller 20 mounted in the pressure gate 17 and having a front handle 21 for use in synchronizing the recorded tracks on the tape with respect to the path of the rotary transducer heads 64, during playback. The tape T also passes over a drive roller 22 and under a pressure roller 23 which is mounted upon an arm pivoted on a pin 24, as clearly shown in Fig. 1.

In order to facilitate the feeding, scanning, and loading of the tape into the machine, provision is made of a scan lever 27 and a load lever 28 which are secured to an operating linkage 29, as fully described in the prior applications above referred to.

The transducer heads 64 are carried on a removable turntable 30 which is provided with a hollow inverted metal shield 31 having a cylindrical skirt 32.

The top of the turntable shield 31 is provided with a central depressed section 33 surrounding which is an annular intermediate section 34, and a raised outer section 35 having eight uniformly spaced elongated slots 36, through which the transducer heads 64 extend.

The intermediate section 34 has four spaced screw holes 37 for receiving four screws 38 which serve to attach the shield 31 to an annular rib 63a on the central turntable body 63. The central section 33 has a pair of opposed holes 39, 39 for receiving a screw driver 41.

Mounted upon the turntable body 63 is a flexible filter coupling 40 including a small central driving disk 42 having four spaced apertures 43, two of which are in alignment with the holes 39, 39, the use of which will be described later. The disk 42 is secured at its inner ends by four rivets 44 to the center of a flexible fabric diaphragm 45 and to a small central driving ring 49.

Provision is also made of a plurality of rivets 46 for securing an outer ring 47 to a ring casting 48 for clamping the outer edge of the diaphragm 45 tightly against said ring casting 48—the latter being secured to the turntable 30 by means of screws 39a.

The turntable 30 is adapted to be driven by an undercut vertical drive spindle 50 which has a reduced threaded upper end 51 for detachable engagement in a tapped hole 52 in the small upper driving ring 49 of the filter coupling 40.

Figure 3:
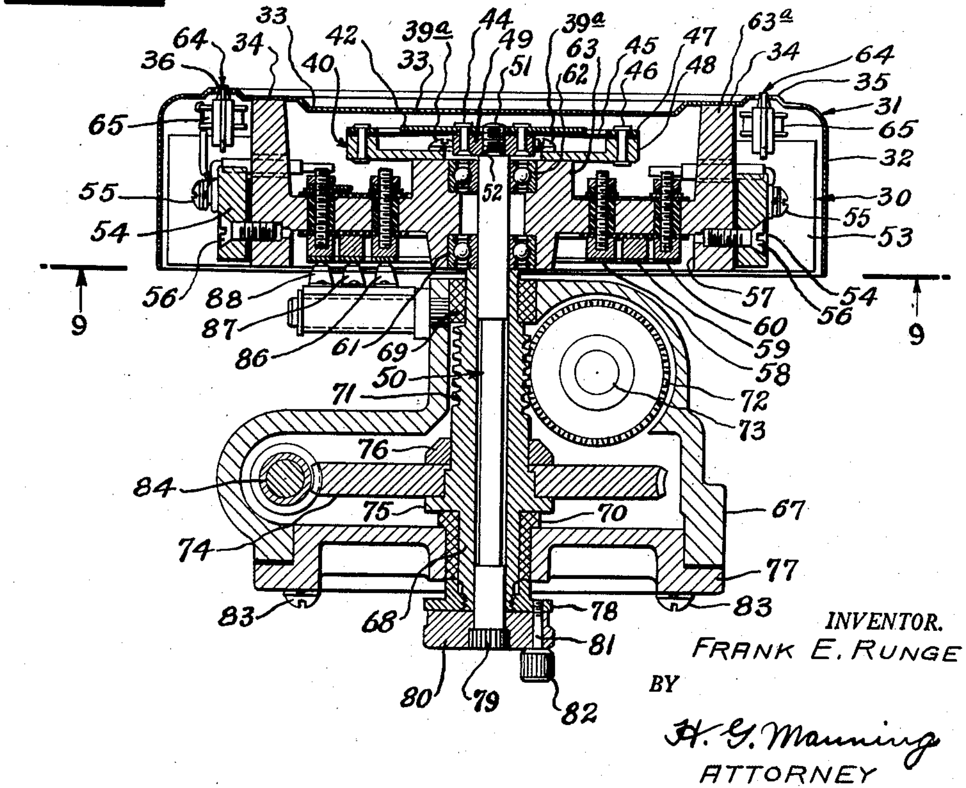
Fig. 3 is a vertical sectional view of the turntable and operating gears taken along the line 3—3 of Fig. 2, looking in the direction of the arrows.
Figure 4:
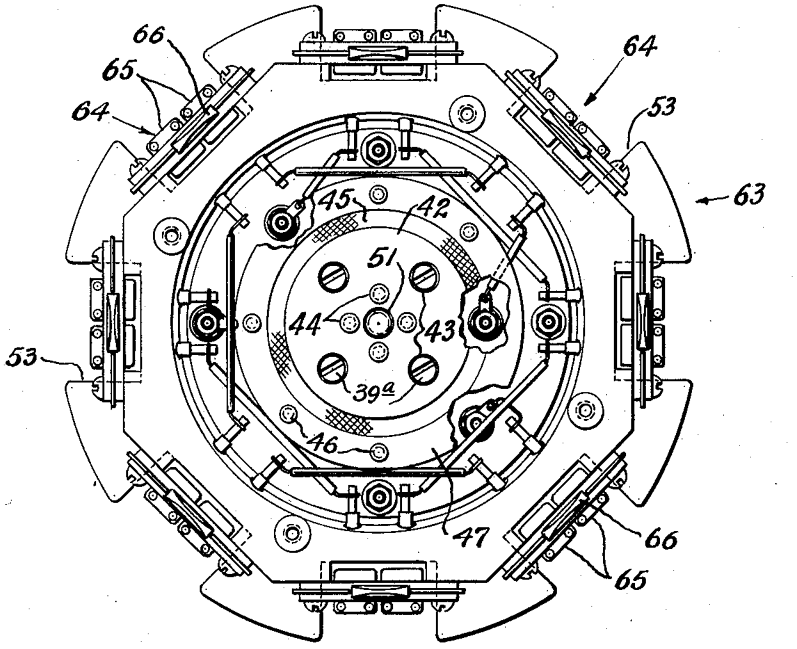
Fig. 4 is a plan view of the turntable with its cover removed.
Figures 7, 8, 9:
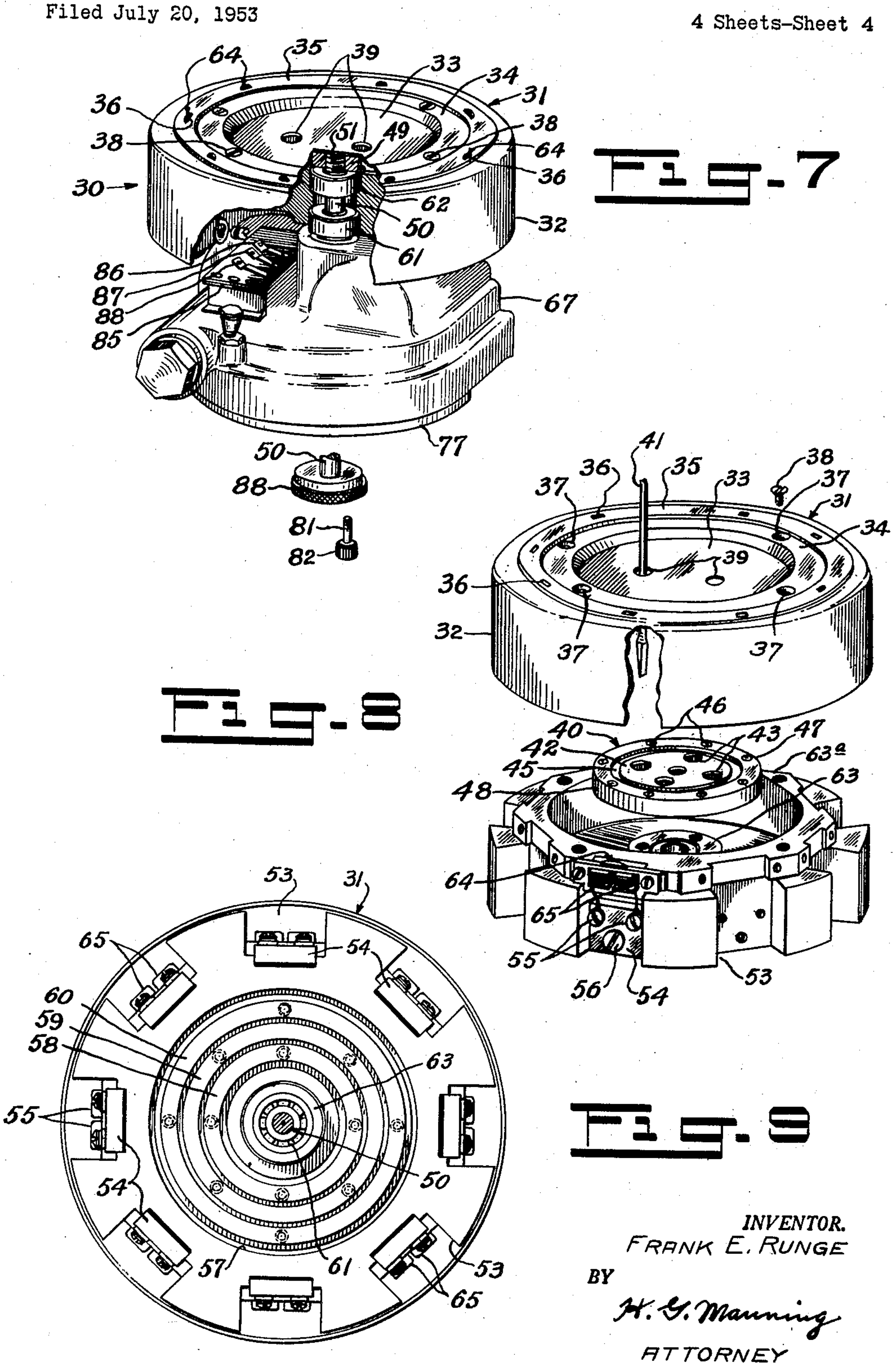
Fig. 7 is a perspective view of the turntable and its cover, the gear box, the supporting bearings and the depressible spindle, with certain parts broken away to show the interior construction.
Fig. 8 is an exploded view showing the flexible filter coupling between the drive spindle and the body of the turntable.
Fig. 9 is a bottom sectional view of the turntable, taken along the line 9—9 of Fig. 3, looking upwardly.

The turntable body 63 is provided with eight outer radial recesses 53 (Fig. 4), within which are located a like number of terminal blocks 54 secured in place by screws 55, 56, as most clearly shown in Figs. 3 and 8 of the drawings. Eight pairs of the screws 55 serve as terminals for the wires leading to the transducer head coils 65.

The bottom of the body 63 is provided with an annular recess 57 (Fig. 3), within which are located three concentric slip rings 58, 59, 60, for engagement by brushes 86, 87, 88 of the brush assembly 85, as clearly shown in Figs. 3 and 7 of the drawing.

The turntable body 63 is provided with a pair of ball bearing assemblies 61, 62 for providing an anti-friction mounting for the drive spindle 50.

Figure 5:
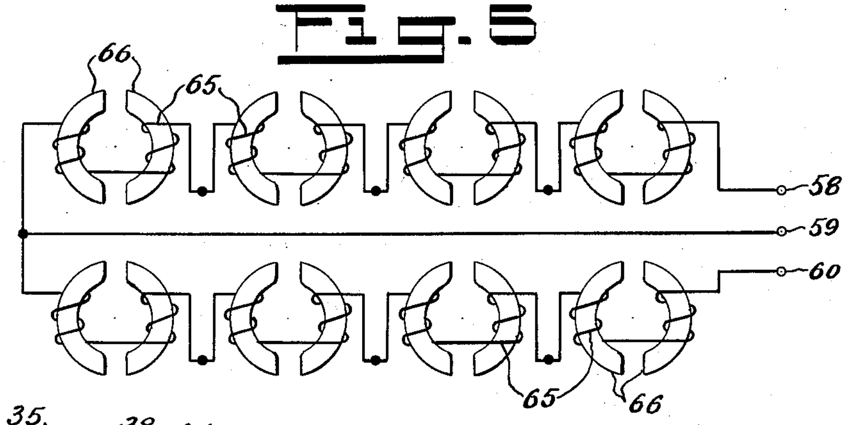
Fig. 5 is a schematic view of the magnetic transducer head cores and their operating coils and circuits.
Figure 6:
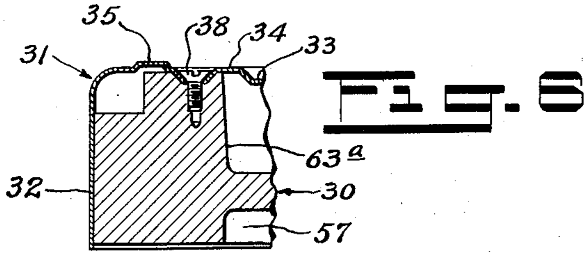
Fig. 6 is a fragmentary transverse sectional view, taken along the line 6—6 of Fig. 2.

Each of the transducer heads 64 has a pair of magnet cores 66 which are energized by pairs of coils 65, as schematically shown in Fig. 5.

Provision is also made, below the turntable 30, of a gear box casing 67 having a bottom dished cover 77 secured to said casing 67 as by screws 83 (Fig. 3).

Located within the gear box casing 67 is a vertical hollow shaft or sleeve 68 surrounding the lower portion of the drive spindle 50 and mounted in oilite bearings 69 and 70 at the top and bottom thereof.

The gear shaft 68 is provided with a worm section 71 which meshes with a tape drive gear 72 mounted upon a horizontal shaft 73.

Provision is also made of a horizontal turntable drive gear 74 seated upon a shoulder 75 forming part of the hollow shaft 68 and held in place frictionally by means of a retaining ring 76 engaging the upper surface of said drive gear 74. A motor driven worm 84 meshes with said gear 74 for simultaneously rotating the turntable 31 and the tape drive gear 72.

In order to permit the spindle 50 to be quickly detached from the turntable 30 and dropped down from the center thereof for releasing said turntable whenever it is desired to replace it with another one, provision is made of a knurled head 79 on the bottom of said spindle 50 surrounded by a knurled ring 80, as clearly shown in Fig. 3.

Provision is also made in the outer portion of the ring 80 of a vertical locking screw 81 having a knurled knob 82 on the lower end thereof for convenience in manipulation. The screw 81 is detachably secured in a tapped hole in a flange 78 on the bottom of the hollow shaft 68.

*Operation*

In view of the fact that the magnetic transducer heads 64 of the turntable 30, will over a period of time, wear down by reason of their rubbing contact with the tape T, it is essential that provision be made for rapidly changing said turntable 30, in order to provide the minimum of interruption to the recording process.

To produce this result, the construction of the present improved magnetic recorder is such that the vertical spindle which drives the turntable may be detached therefrom by dropping it from the latter, which then may be laterally removed from the apparatus.

The purpose of the holes 39 in the shield 31 is to permit the small ring 49 to be held from turning by the insertion of the screw driver 41 through one of the apertures 43 of the disk 42. This is necessary in case the diaphragm 45 should be torn completely away from the driven section of the flexible filter coupling 40, including the rivets 46 and the outer ring casting 48.

In other words, if the flexible filter coupling 40 should be torn, the spindle 50 could not otherwise be unscrewed, but by inserting the screw driver through the holes 39 and 43 as mentioned above, the drive ring 49 can be held in position to permit the unscrewing of the drive spindle 50.

When it is necessary to remove the magnetic head turntable 30 from the apparatus, the power will first be shut off, and the load and scan levers 27, 28 turned to fully clockwise positions as far as they will go. The brushes 86, 87, 88 will then be pulled down away from the slip rings 58, 59, 60, below the turntable, and the locking thumb screw 81 will be unscrewed. The spindle 50 will then be unscrewed from the ring 49 and dropped down below the turntable 30, which may then be easily removed laterally. To install a new turntable 30, the reverse process will be performed.

While there has been disclosed in this specification one form in which the invention may be embodied, it is to be understood that this form is to be shown for the purpose of illustration only, and that the invention is not to be limited to the specific disclosures, but may be modified and embodied in various forms without departing from its spirit. In short the invention includes all the modifications and embodiments coming within the scope of the following claims.

Having thus fully described the invention, what is claimed as new and for which it is desired to secure Letters Patent, is:

1. In a long playing magnetic tape recording and reproducing apparatus of the type wherein successive arcuate sound tracks are traced across a moving magnetic tape by means of rotating transducer heads, the combination comprising a turntable having a plurality of spaced apart electromagnetic transducer heads located below the path of said tape, resilient means above said tape to press it into contact with said heads while said sound tracks are being traced, a vertical spindle for driving said turntable threadedly connected at its upper end to said turntable, a rotatable sleeve member surrounding the lower end of said spindle, a horizontal gear mounted on said sleeve, a horizontal motor-driven worm meshing with said horizontal gear for rotating said sleeve, and releasable means interconnecting said sleeve and said shaft for simultaneous rotation thereof, said releasable means being operative to allow downward vertical withdrawal of said spindle with respect to said sleeve.

2. The invention as defined in claim 1, in which said drive spindle is provided with a knurled bottom knob to permit said spindle to be manually unscrewed from said turntable upon release of said releasable means, and vertically withdrawn so that said turntable may be removed horizontally from said apparatus.

3. The invention as defined in claim 1, wherein said releasable means comprises a thumb-screw engageable in a threaded opening in the lower end of said sleeve member.

4. In a long playing magnetic tape recording and reproducing apparatus employing mechanism for longitudinally advancing a magnetic tape through the apparatus, and a turntable having a plurality of radially spaced electromagnetic transducer heads located below the path of said tape, the combination comprising means for rotating said turntable, resilient means above said tape to press it down into contact with said heads for tracing a series of transverse parallel arcuate record tracks on said tape, said turntable rotating means comprising a vertical spindle threadedly connected at its upper end to said turntable, a rotatable sleeve member coaxially fitted around the lower end of said spindle, releasable means interconnecting said spindle and said sleeve for simultaneous rotation, the bottom end of said spindle extending below the lower end of said sleeve member, and releasable means at the bottom of said spindle for locking said spindle to said sleeve member and permitting said spindle to be dropped downwardly to allow lateral removal of said turntable.

5. The invention as defined in claim 4, in which a gear box is provided for housing and supporting said spindle and said sleeve member.

6. The invention as defined in claim 5, in which provision is made of anti-friction bearings for said sleeve member mounted in the top and bottom portions of said gear box.

7. The invention as defined in claim 3, in which said sleeve member is formed with an integral bottom flange having an opening into which said bottom knob is screwed.

References Cited in the file of this patent

UNITED STATES PATENTS

| | | |
|---|---|---|
| 1,988,343 | Tacy | Jan. 15, 1935 |
| 2,245,286 | Marzocchi | June 10, 1941 |
| 2,326,332 | Clausen | Aug. 10, 1943 |
| 2,750,449 | Thompson | June 12, 1956 |

FOREIGN PATENTS

| | | |
|---|---|---|
| 635,549 | Germany | Sept. 25, 1946 |